Figure 1:
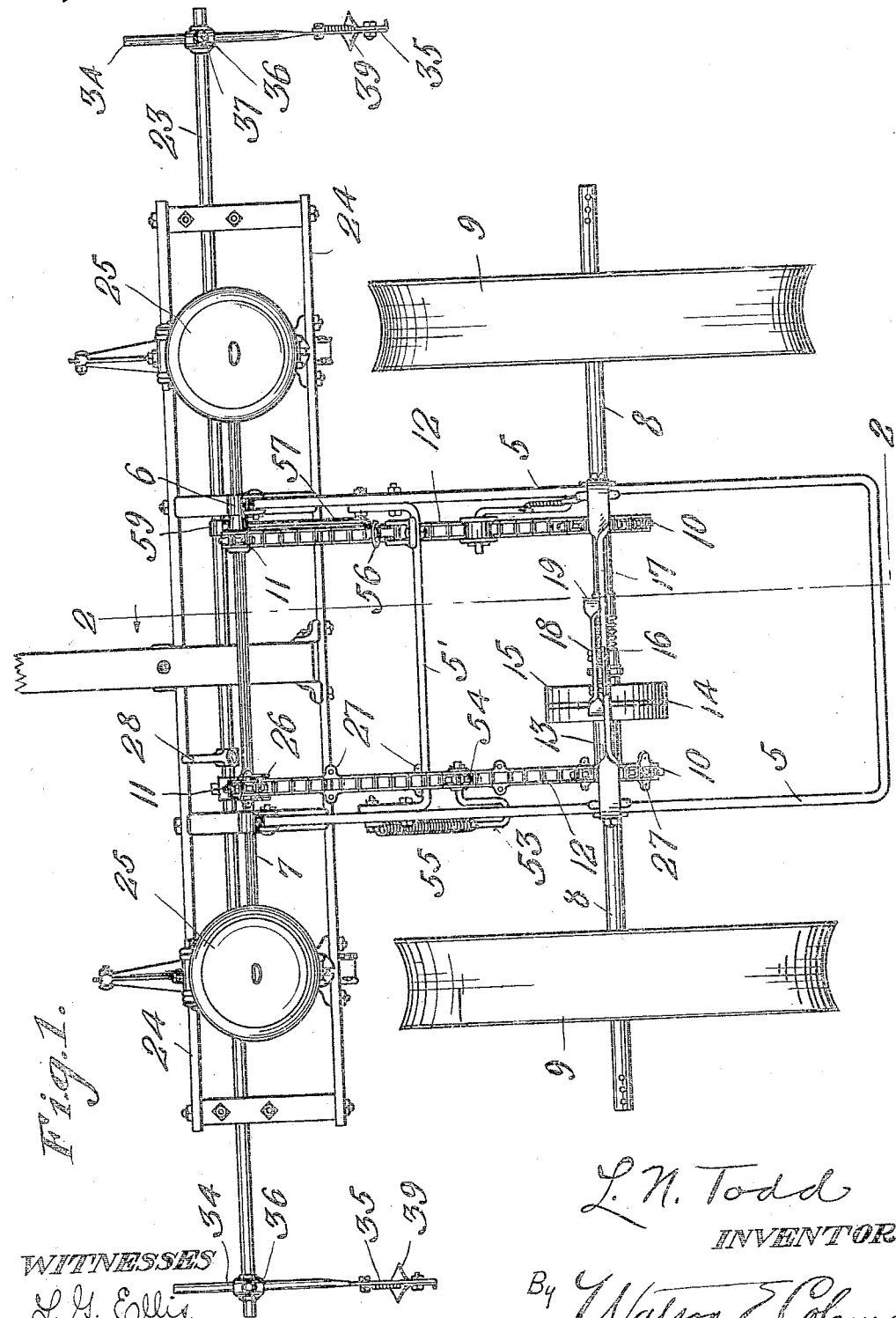

L. N. TODD.
SEED PLANTER.
APPLICATION FILED NOV. 3, 1909.

953,870.

Patented Apr. 5, 1910.
2 SHEETS—SHEET 1.

WITNESSES
L. H. Ellis
E. M. Ricketts

L. N. Todd
INVENTOR

By Watson E. Coleman

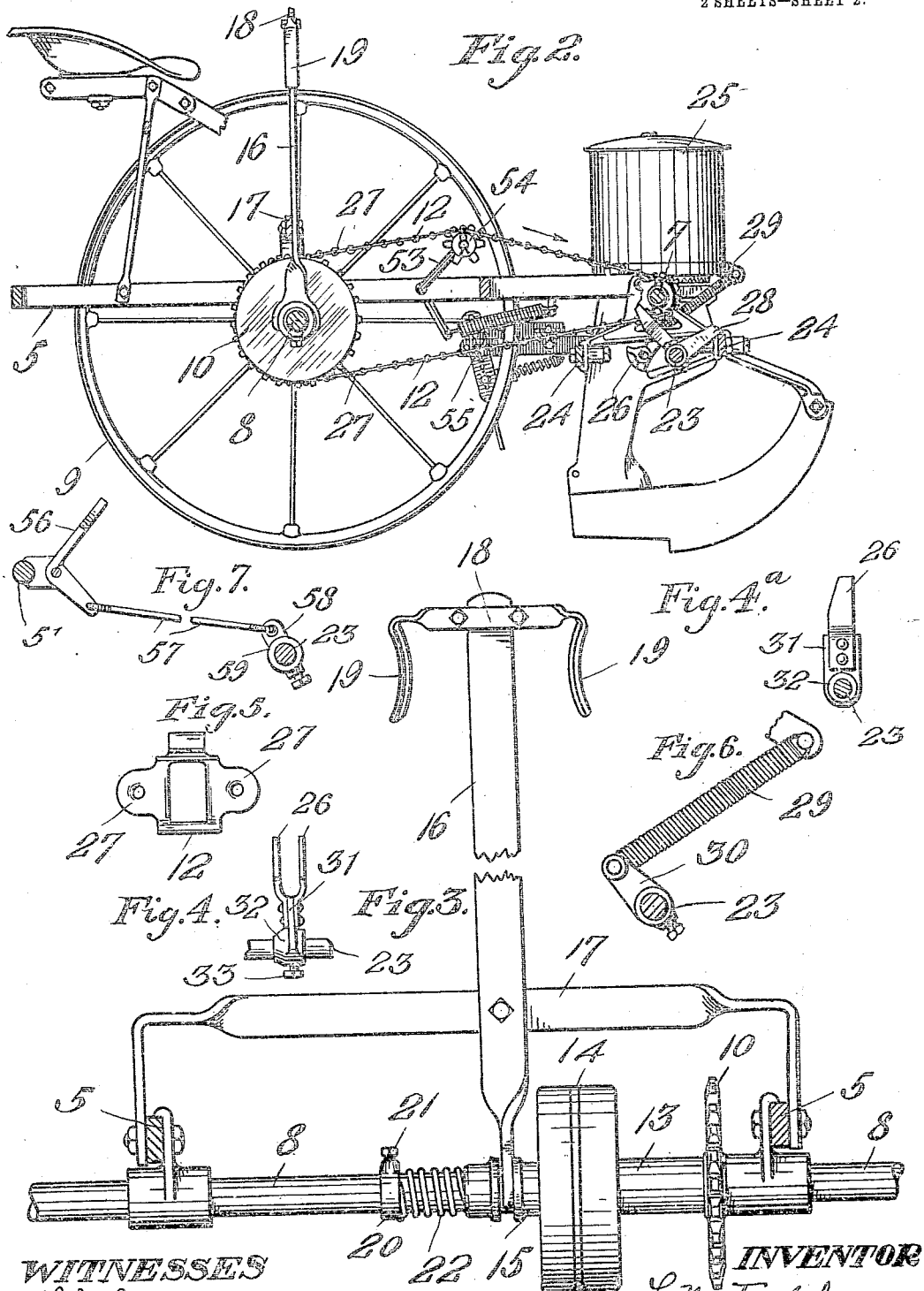

UNITED STATES PATENT OFFICE.

LUTHER N. TODD, OF CANTON, ILLINOIS.

SEED-PLANTER.

953,870.  Specification of Letters Patent.  Patented Apr. 5, 1910.

Application filed November 3, 1909. Serial No. 526,132.

*To all whom it may concern:*

Be it known that I, LUTHER N. TODD, a citizen of the United States, residing at Canton, in the county of Fulton and State of Illinois, have invented certain new and useful Improvements in Seed-Planters, of which the following is a specification, reference being had to the accompanying drawings.

This invention relates to certain new and useful improvements in corn planters and has for its primary object to provide means for operating marking arms to indicate the points at which the corn hills are deposited, said arms being simultaneously actuated with the dropping mechanism, whereby the hills of corn may be deposited in regular parallel rows.

A further object resides in the provision of suitable mechanism whereby the corn may be dropped in the hills either automatically or manually, suitable means being provided, whereby the automatically actuated mechanism may be thrown out of operation in the event that the hill rows become disalined.

With these and other objects in view, the invention consists of the novel features of construction and the combination and arrangement of parts hereinafter fully described and claimed, and illustrated in the accompanying drawings, in which—

Figure 1 is a top plan view of a machine constructed in accordance with the present invention; Fig. 2 is a vertical section taken on the line 2—2 of Fig. 1; Fig. 3 is an enlarged elevation of the sliding clutch for controlling the operation of the dropper; Figs. 4 and 4ª are edge and side views, respectively, of the rock shaft actuating arm; Fig. 5 is a detail view of one of the arm engaging links; Fig. 6 is a detail side elevation of the rock shaft spring; and Fig. 7 is a detail view of the foot lever and its connections to the rock shaft.

Referring to the drawings 5 indicates a substantially rectangular frame, the forward ends of which are provided with the bearings 6 in which a transverse shaft 7 is mounted. A wheel supporting shaft or axle 8 is also mounted in the frame 5 intermediate of its ends and rigidly secured thereon are the traction wheels 9. Gears 10 are secured upon the wheel shaft 8 within the frame and similar gears 11 of smaller diameter are likewise secured upon the shaft 7. Endless link chains 12 extend over these gears or sprocket wheels and transmit rotary motion from the wheel shaft, as will hereinafter appear. One of the sprockets or gears 10 is integrally formed with a tubular sleeve 13 loosely disposed upon the shaft 8. The inner end of this sleeve is formed with a clutch disk 14, the other clutch member being carried upon a sliding collar 15. This collar is preferably keyed upon the shaft and receives the lower bifurcated end of a pivoted lever 16. This lever is pivotally mounted adjacent to its lower end upon a transversely positioned bar 17, the opposite end portions of which are vertically extended and secured to the sides of the frame 5. The upper end of the lever 16 has secured thereto a knee engaging bar 18. As shown, this bar is downwardly and inwardly curved upon opposite sides of the lever to provide the knee engaging end portions 19. A collar 20 is rigidly secured upon the wheel shaft by means of a set screw 21 and disposed between this collar and the clutch collar 15 there is a spiral spring 22. This spring is normally adapted to maintain the clutch members in engagement.

A friction clutch is preferably employed for reasons which will be later apparent but it is to be understood that various other forms of clutches may also be employed within the scope of the invention.

The strength of the spring 22 is hardly sufficient to so engage the friction faces of the clutch disks that the gear 10 will rotate with the wheel shaft, and it is necessary for the operator to press with his knee the curved end 19 of the bar 18 so that the sliding clutch disk will be forced into firm engagement with the face of the disk carried by the sleeve 13. Thus the chains 12 will be moved between the wheel shaft 8 and the transverse gear shaft 7.

A rock shaft 23 is also journaled in suitable bearings carried by the frame, and extends transversely beyond the opposite ends of a transversely positioned frame 24. This frame carries adjacent to its ends the seed boxes 25 in which are seed disks automatically actuated to drop a predetermined quantity of seed. Upon the rock shaft 23 a forked arm 26 is secured and normally extends rearwardly at an angle thereto. This arm is adapted to be successively engaged by a plurality of ears or lugs 27 which are formed upon certain of the links of one of the chains 12. The construction of the seed box mechanism whereby the seeds may be released therefrom forms no part of the present invention and will not here be set forth in detail. The engagement, however, of the ears 27 with the arm 26 will rock the shaft 23 in its bearings and intermittently actuate the seed dropping mechanism. These chain links may be arranged as desired and in any suitable number.

In order to return the rock shaft to its normal position, an arm 28 is rigidly secured thereto and extends angularly therefrom in the opposite direction to the arm 26. A spring 29 has one end secured to an arm 30 carried by the rock shaft and its other end connected to the seed box, as clearly shown in Fig. 2. This spring, through its retractile force reverses the rocking of the shaft 23 until the arm 28 engages with the front longitudinal bar of the frame 24, when such rocking motion ceases and the arm 26 is again positioned to be engaged by the next succeeding ear 27. The arm 26 is shown in detail in Figs. 6 and 6ª, upon reference to which it will be noted that this arm comprises two plates which are secured to the opposite sides of a short plate 31 integrally formed with a sleeve 32 rigidly secured to the rock shaft by means of the set screw 33. The arm plates are bent outwardly in opposite directions to form a forked or bifurcated arm through which the links of the chain 12 pass in their movement between the gears 10 and 11. It will be obvious that the ears 27 upon the opposite sides of the link chains will engage with the arm plates and throw the arm 26 downwardly, the chain moving in the direction of the arrow in Fig. 2. In the manner above described, the seed box actuating mechanism will be operated intermittently by the travel of the chain 12, and these intermittent operations will occur at predetermined intervals in accordance with the disposition of the ear links 27, whereby the corn will be dropped into the hills in regular parallel rows.

In order to provide means whereby the parallelism of these rows may be maintained after the machine has been turned, I provide the marking arms 34 upon the opposite ends of the rock shaft 23. These arms comprise a cylindrical shank having a lower rectangular portion 35. The cylindrical shank extends through a sleeve 36 in the form of a T-coupling, which is disposed upon the rock shaft. A marking foot 39 is carried upon the arm and is adapted to intermittently engage with the ground surface.

Suitable means are also provided for tightening the chains 12. As shown, it comprises a crank rod 53 which is rotatably disposed through the side of the frame 5 and has rotatably mounted upon its inner end a pinion 54. The outer end of the shaft 53 extends below the frame and has secured thereto one end of a retractile spring 55, the other end of which is secured to the machine frame in any suitable manner. Through the action of this spring the pinion 54 is at all times held in engagement with the endless chain 12 and as the same slackens, this pinion is moved upwardly and compensates for the slack of the chain, thus insuring the positive operation of the seed dropping mechanism.

Upon starting the corn planting operation, after the machine has been moved over the field in one direction, it may be found that the automatic actuation of the dropping mechanism would not deposit the corn in alinement with the rows previously deposited. To obviate such an exigency, I provide a foot treadle 56 which is pivoted upon a cross bar or brace 5′ of the frame, see Fig. 7. To the lower depending portion of this treadle one end of a link rod 57 is pivoted, the other end thereof being pivoted in an eye 58 formed upon a sleeve 59 rigidly secured on the rock shaft 23. Thus the operator may actuate the seed dropping mechanism when the boxes have been moved to a position in alinement with the previously arranged row of hills, and the corn then dropped as desired. The pressure upon the clutch lever 16 may be so adjusted as to move the ear link into position to engage with the arm 26 at the proper time for planting the next succeeding row so that the desired alinement is thus secured. The operation of the machine may then continue as previously described.

From the foregoing it will be seen that I have provided an improved corn planting machine, whereby suitable marking arms are simultaneously actuated to indicate the points at which the corn was deposited so that the rows upon the return trip of the machine may be deposited in alinement therewith. The elements employed are extremely simple and the positive actuation of the mechanism is absolutely assured. The marking arms are, moreover, of such construction that they are rendered exceedingly durable and strong and the vibration of their contact with the ground, which has heretofore had a disastrous effect upon the several elements comprising the same, is to a large extent eliminated.

The above description sets forth what I believe to be the preferred embodiment of my invention, although it will, of course, be understood that minor changes and alterations may be made in the form, size, and proportion of the various elements and their relation to each other without materially affecting the essential features or departing from the spirit of the invention.

Having thus described the invention what is claimed is:

1. In a machine of the character described, the combination with a wheeled frame, of a transverse frame supported beneath the forward end of said wheeled frame, a rock shaft journaled in said frame, seed boxes carried by said transverse frame, mechanism for opening and closing said seed boxes, means for intermittently operating said mechanism, marking arms adjustably carried by said rock shaft adapted to engage with the ground surface co-incident with the depositing of the seed, an arm carried by said rock shaft adapted to be engaged by said operating means and an arm secured on the rock shaft extending oppositely to the first named arm adapted to engage with said transverse frame to position said arm for engagement by the operating means.

2. In a machine of the character described, the combination with a wheeled frame, of a rock shaft carried in the forward end of said frame, seed boxes supported upon opposite sides of the frame, operating mechanism for opening and closing said boxes to deposit the seed, means for intermittently operating said mechanism, marking devices secured to the ends of the rock shaft adapted to engage with the ground surface co-incident with the depositing of the seed, means secured to the rock shaft and extending rearwardly thereof adapted to be engaged by said operating means to rock the shaft, a coil spring connected to said rock shaft and adapted to yieldingly hold said arm in its normal position and means for preventing the retraction of said arm by the spring beyond its normal position.

3. In a machine of the character described, the combination with a rectangular frame, of a wheel supporting shaft journaled in said frame, a transverse shaft journaled in the outer end of said frame, sprockets arranged on each of said shafts, one of the sprockets on said wheel shaft being integrally formed with a sleeve loose on the shaft, one end of said sleeve carrying a clutch disk, a collar keyed on said shaft for sliding movement carrying a clutch disk adapted to frictionally engage the first named disk, a collar rigidly secured on said shaft, a spring disposed between said collar and the sliding clutch collar normally adapted to yieldingly hold the clutch faces in engagement, a clutch lever pivoted between its ends adapted to force the friction disks into locking engagement, seed boxes mounted and supported upon opposite sides of the frame, a rock shaft journaled in bearings beneath said seed boxes and extending beyond the same, an arm rigidly secured on said shaft, means carried by one of said chains, intermittently engaging with said arm to rock the shaft, means for returning the shaft to its normal position, and marking arms adjustably secured on said rock shaft for simultaneous actuation with the seed boxes.

4. In a machine of the character described, the combination with a wheeled frame, of gears arranged on the wheel shaft within the frame, one of said gears being loosely mounted on the shaft, means for locking said gear for rotative movement with the shaft, a transverse shaft journaled in the forward end of said frame, a gear rigidly secured on said shaft adjacent to each side of the frame, an endless chain connecting said gears upon the wheel shaft, a transverse frame disposed below the forward end of said main frame, a seed box mounted adjacent to the opposite ends of said transverse frame, a rock shaft journaled in said transverse frame and extending beyond the ends thereof, a marking arm adjustably secured upon each end of said shaft, a forked arm rigidly secured to said shaft and extending inwardly at an angle thereto, one of said chains passing between the arms of said fork, and means arranged in spaced relation on said chain to intermittently engage said arm and rock the shaft.

5. In a machine of the character described, the combination with a main frame, of a wheel supporting shaft journaled therein, a transverse shaft journaled in the forward end of said frame, sprockets secured on each of said shafts and connected by endless chains, certain of the links of one of said chains having laterally extending ears formed integral therewith, said links being equally spaced from each other, a transverse frame supported below the main frame, a seed box arranged adjacent to each end of said transverse frame, a rock shaft journaled in said frame, a forked arm rigidly secured to said shaft and extending inwardly at an angle thereto, a stop arm secured on said shaft and extending forwardly thereof, normally engaging with the frame to position the forked arm for engagement by said ears, the ears of said chain link being adapted to engage with the forked arm to actuate the rock shaft, a retractile spring secured to an arm carried by the shaft, adapted to return the shaft to its normal position and a marking arm adjustably carried on each end of said rock shaft.

In testimony whereof I hereunto affix my signature in the presence of two witnesses.

LUTHER N. TODD.

Witnesses:
H. C. MORAN,
C. E. WEED.